Aug. 6, 1957   M. J. ZUCROW ET AL   2,801,517
DETONATION TRAP FOR LIQUID EXPLOSIVES USING
FRANGIBLE COUPLING
Filed March 18, 1947   3 Sheets-Sheet 1
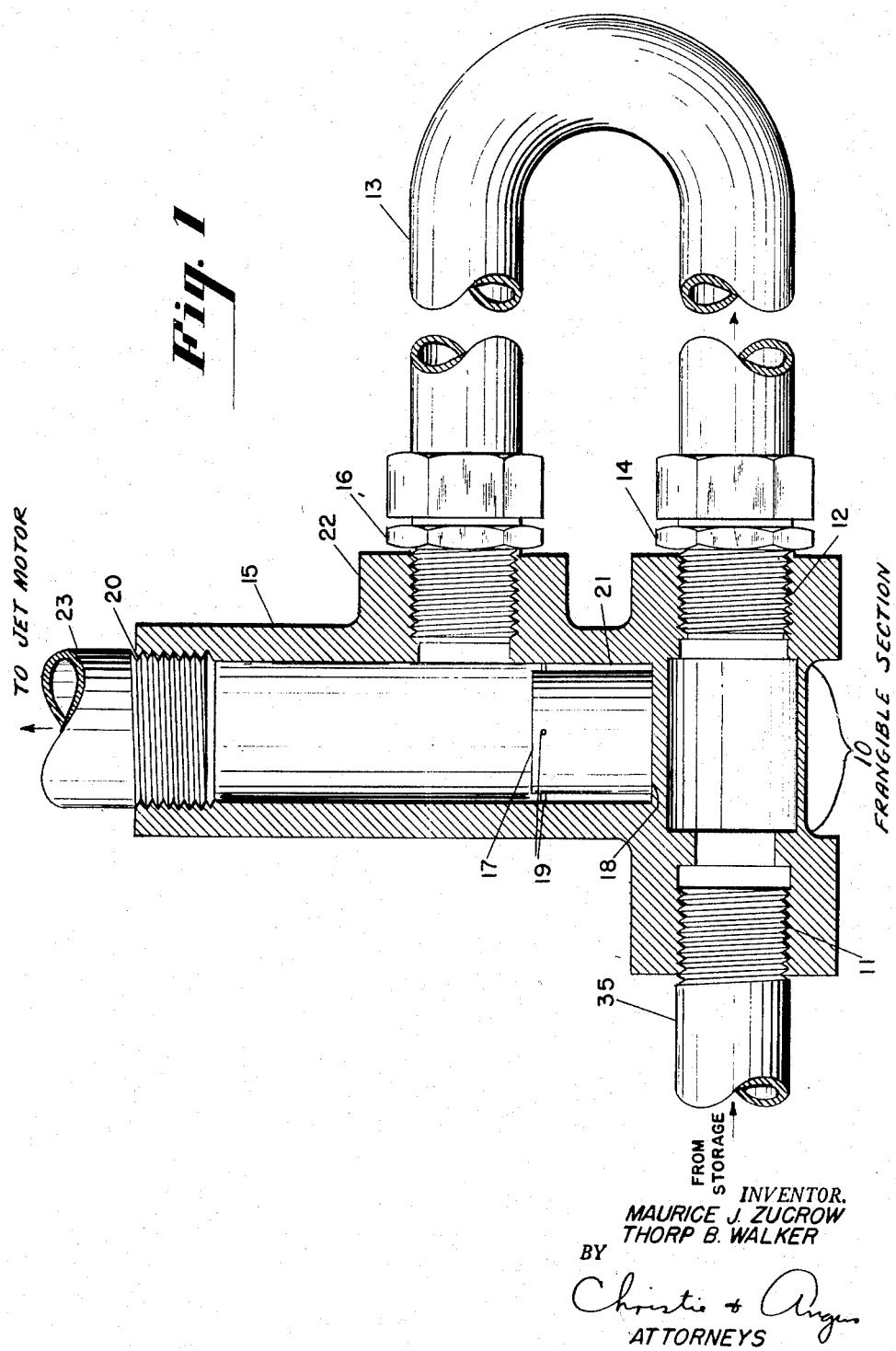
INVENTOR.
MAURICE J. ZUCROW
THORP B. WALKER
BY
Christie & Angus
ATTORNEYS

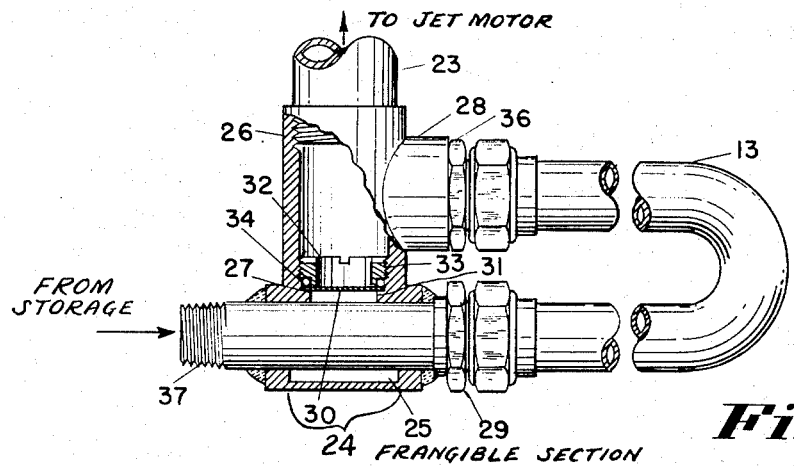
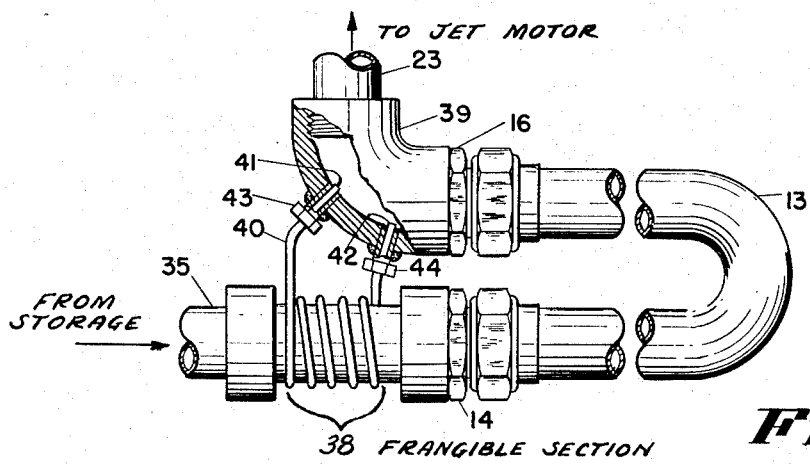
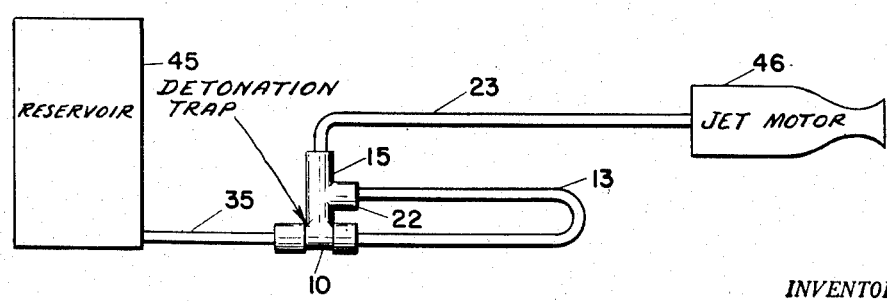

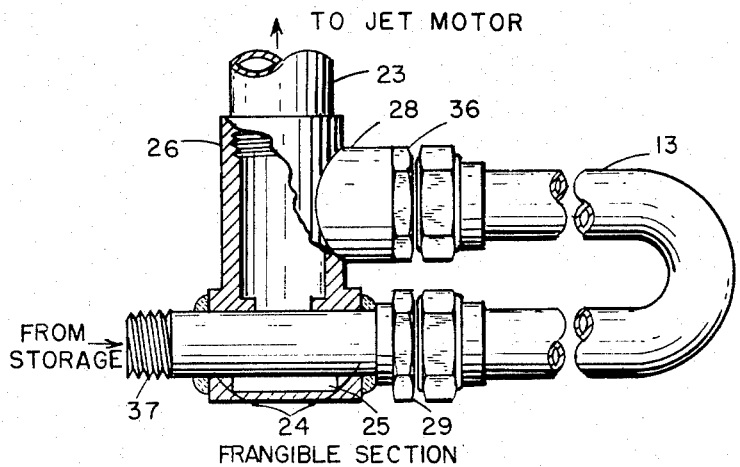
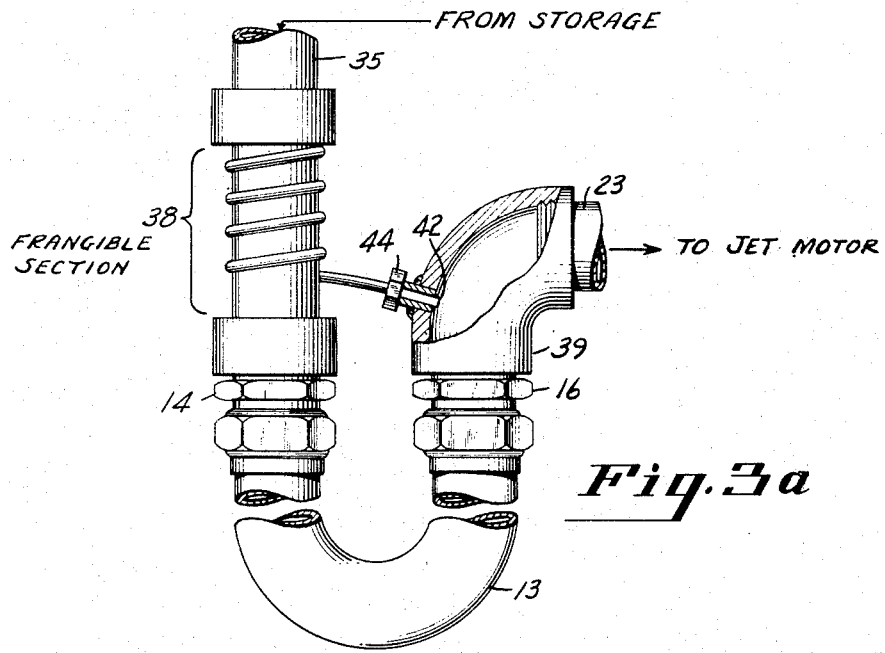

United States Patent Office 2,801,517
Patented Aug. 6, 1957

2,801,517

DETONATION TRAP FOR LIQUID EXPLOSIVES USING FRANGIBLE COUPLING

Maurice J. Zucrow, West Lafayette, Ind., and Thorp B. Walker, Pasadena, Calif., assignors, by mesne assignments, to Aerojet-General Corporation, Cincinnati, Ohio, a corporation of Ohio Application March 18, 1947, Serial No. 735,380

9 Claims. (Cl. 60—35.6)

This invention relates to safety devices for preventing explosions and has for its principal object to provide a device for preventing the propagation of explosions through conduits containing liquid detonable materials.

It has been a practice in many instances to convey detonable or explosive liquids or fluids from a reservoir through a device or place where the fluid is used. For example, motors such as jet propulsion motors have been operated by use of such explosive or detonable liquids as nitromethane or other detonable liquid nitroparaffins or nitroaromatics. In such applications, it is customary to convey the liquid from the container or reservoir to the injection device of the motor for use in the motor. Such systems involve the danger of detonations originating either in the motor or consuming device or in the conduit itself and being carried back through the conduit to the reservoir. The detonation or explosion usually is of relatively minor consequence when at the motor or in the conduit; but if it reaches the reservoir, a major explosion may occur.

In accordance with our present invention, we provide means for reducing this hazard by providing an explosion or detonation trap adapted to be placed in the conduit between the storage reservoir and the motor or other outlet of the conduit. Explosions or detonations occurring at the opposite side of the trap from the reservoir are stopped at the trap and prevented from carrying the detonation back to the reservoir. The trap comprises a frangible section of the conduit followed at the downstream side of the frangible section by a conduit section which is looped or brought back to a position close to the frangible section. Thence the conduit is carried along in its normal course to the utilization device.

A feature of the invention is the provision of a section or arm extending from the conduit and carried into physical contact or proximity with the frangible wall of the frangible section; this latter section or extension being relatively short as compared with the length of the loop.

By reason of this construction of the trap, the normal flow of the liquid substance to its utilization device will be from the reservoir through the frangible section and thence through the looped or re-entrance portion and then on to the utilization device, such as the jet motor. In the event of an explosion or detonation at the downstream side of the trap, however, the detonation wave will be carried back through the liquid in the conduit. At the point where the detonation wave reaches the junction of the loop and the short blind arm or extension, the wave will divide; and since the distance through the short arm is much shorter than through the loop, the detonation will shatter the frangible wall of the frangible section before the detonation wave travelling through the loop can reach the same frangible section. Thus when the main detonation wave travelling backward through the loop reaches the frangible section, it will find the frangible section already shattered so that the wave will be interrupted and will not be carried on back to the reservoir.

According to a preferred feature, the loop or re-entrance portion of the conduit is made substantially in the form of a U-tube having one end connected to the frangible section and the other end connected into the downstream section of the conduit.

According to a further feature of one embodiment, the downstream section is brought back to abut against the frangible section and thereby shatter.

According to a further feature of another embodiment, the downstream section of the conduit is brought back adjacent a chamber in contact with the frangible section so that the detonation will be brought back to the chamber, thereby breaking the frangible section.

According to a feature of another embodiment, there is provided a by-pass conduit or tubing from the section of the conduit downstream from the loop, and the tubing is brought into proximity with the frangible section so that detonation in the tubing will fracture the frangible section.

Other features of the invention reside in the provision of a suitable plug or diaphragm or other means at the downstream side of the loop and in proximity with the frangible section so as to aid in its destruction.

The foregoing and other features of our invention will be better understood from the following detailed description and the accompanying drawings of which:

Fig. 1 is a cross section view of one embodiment of the detonation trap;

Fig. 2 is a cross section view showing a detonation trap in which the by-pass section terminates in an annular chamber surrounding the frangible conduit;

Fig. 2a shows a modification of the detonation trap of Fig. 2;

Fig. 3 is a modification showing an explosive coil surrounding the frangible section;

Fig. 3a shows a modification of the coil surrounded frangible diaphragm; and

Fig. 4 shows schematically the method in which the detonation trap is employed.

In Fig. 1 there is shown a section of a conduit 35 carrying detonable fluid from a storage reservoir in the direction of the arrow to a downstream section of conduit 23 which delivers the fluid to a utilization device such as a jet motor or the like. Fig. 4 shows such a general arrangement for feeding fuel from a reservoir 45 to a jet motor 46. There is included in the conduit between the two sections 35 and 23 a detonation trap. This comprises a frangible section 10 provided with threads 11 and 12 at either end. This section is preferably made of brittle material capable of withstanding relatively high steady pressures, but shattered easily when subjected to violent shocks or blows. Materials suitable for this device are cast aluminum, thin cast iron, non-metallic materials such as brittle plastics, nonporous ceramics, glass, etcetera.

The frangible section has built out from it a short length of conduit 15 abutting against the wall 18 of the frangible section 10, the wall 18 preferably being flat and serving to separate the interior of conduit 15 from the interior of section 10. The end of conduit 15 opposite the wall 18 is threaded at 20 for coupling with the conduit section 23.

A threaded side outlet 22 is provided in the wall of member 15, and a U-tube 13 is attached at one end to the side outlet 22 by a fitting 16, while the other end is connected by fitting 14 to the threaded outlet of frangible section 10.

A cylindrical plug 17, preferably of metal and slightly smaller in diameter than the inside diameter of tube member 15, is placed within tube member 15 and against the closed end 18. The difference between the inside diameter of member 15 and the outer diameter of plug 17 forms an annular space 21 when the plug is in place, This is proportioned to provide a desired volume of detonable fluid in the annular space around plug 17. Plug 17 is kept in a central position within tube member 15 by means of a number of small projections 19 spaced around the plug. In the embodiment shown in Fig. 1, the bottom of the side exit 22 is positioned close to and only slightly above the top of plug 19 to minimize the distance which an explosion wave must travel backward from conduit 23 to explode the fluid surrounding plug 17.

The manner in which the detonation trap shown in Fig. 1 operates is shown schematically in Fig. 4. An explosion wave travelling in conduit 23 from the end terminating in jet motor 46 reaches tube member 15. The wave then branches at the side outlet 22, one wave following the path of U-tube conduit 13 while the other wave continues in the original direction down tube 15, reaching the limited amount of fluid surrounding plug 17. This is exploded, and the shock of the explosion causes the frangible section 10 to break, leaving a gap sufficiently wide to prevent the detonation wave which is travelling in U-tube 13 from continuing beyond the gap formed by the rupture of frangible member 10. This prevents the further propagation of the detonation wave back into conduit 35 and the storage container 45.

An alternative embodiment is shown in Fig. 2 in which a frangible section 24 is surrounded by an annular chamber 25. A tube member 26 is fitted at one end to the upstream end of conduit 23 and has its opposite end terminating at an opening 27 leading into the annular chamber 25. A side outlet 28, provided through the wall of the tube member 26, is threaded to engage a coupling member 36. Frangible member 24 is provided at one end with a suitable coupling member 29 and at the other end with coupling means such as threads 37.

A U-tube 13 is attached at one end to frangible section 24 by means of coupling member 29, and the other end is attached to the side outlet 28 of tube member 26 by means of coupling member 36 in a manner similar to that described in Fig. 1.

Annular chamber 25 may have either the same liquid flowing in the principal conduit 23, or it may have a detonable or explosive liquid having a faster rate of detonation than the liquid being carried through the conduit. In event that a different material is employed in annular chamber 25 than that flowing through the main conduit system, it is desirable to separate this material from the liquid passing through the tube 26. This may be done by employing a thin diaphragm 30 which may be held in place against a shoulder 31 by means of an annular nut 32 which turns in threads 33 provided in the bottom of section 36, as shown in Fig. 2. Contamination of the fluid within the annular section is prevented by an O-ring 34 against which the annular nut 32 tightens. In the event that the same liquid is to flow in chamber 25 as in conduit 23 the diaphragm will be omitted as shown in the arrangement of Fig. 2a.

This form of embodiment operates in a manner similar to that described by the operation of Fig. 1. An explosion starting anywhere in conduit 23 will travel through tube member 26 until it reaches the separating diaphragm 30. In the meantime, the principal wave has entered side outlet 28 and is travelling in U-tube 13. Explosion of the material above the diaphragm will cause the detonation of the material in the annular section 25 which on exploding will crush frangible section 24 and at the same time destroy annular section 25, thereby interrupting the path of the detonation wave travelling in U-tube 13.

A third modification is shown in Fig. 3. In this embodiment a frangible section 38 is provided with suitable means such as threads at either end for connecting it to conduit 35 at one end and a coupling member 14 at the other end. A U-tube 13 is connected to the frangible section 38 by coupling 14 and the other end of the U-tube is connected to an L-shaped tube 39 by means of coupling member 16. A smaller conduit 40 is spiralled around the outside of frangible section 38, both ends 41 and 42 terminating inside L 39. The spiral conduit 40 is held securely in place in L-shaped tube 39 by couplings 43 and 44.

Small conduit 40 is filled with an explosive material which may be a material flowing in L-shaped tube 39 and conduit 23; or it may be filled with a secondary explosive having a much faster rate of detonation than the liquid flowing through the main conduit. A commercial explosive cable such as, for example, a primacord cable may be substituted for small conduit tube 40 and wrapped around frangible section 38 in a manner similar to tube 40. A primacord cable is a flexible cable containing explosive. The ends of the explosive cable are also positioned to terminate inside L-shaped tube 39. In some instances it may be desirable to have only one end of the tube or cable projecting into L-shaped tube 39, as is shown in Fig. 3a.

The detonation wave travelling in conduit 23 reaches L-shaped tube 39 and the detonation of the material therein initiates the explosion of the material in tube or cable 40 while the principal wave continues down the path provided by U-tube 13. The explosion of material in tube or cable 40 crushes frangible section 38 about which it is wrapped causing its collapse, thus effectively interrupting the path of detonation wave travelling in U-tube 13.

In all the embodiments the amount of material employed to rupture the frangible section is maintained at a minimum to prevent initiating a new detonation wave in the material within the frangible section.

The detonation traps described in the above embodiments provide a positive means for preventing a minor explosion occurring at any portion in a conduit system from propagating itself into a major explosion by reaching the principal storage source.

Such devices are of particular advantage where portions of the system may be subjected to sudden shocks or jars. Where many portions of the system may be thus affected, a series of traps may be installed to insure added protection.

It will be understood that the invention is not limited to the particular details shown and described, which are given by way of illustration rather than of limitation. For example, in Fig. 1, the tube member 15 may be made as a separate part placed against the frangible section, rather than integral therewith, as shown. Again, the shape of the returning tube 13 is shown in Fig. 1 as a U-tube, however, this may be any other suitable configuration. The invention is not limited except in accordance with the scope of the appended claims.

We claim:

1. An explosion arresting device for arresting a detonation wave travelling through a fluid in a conduit comprising a frangible conduit section for inclusion in the conduit, a cylindrical tube included in the conduit downstream from the frangible section, and having a closed end, the closed end contacting said frangible conduit section, said cylindrical tube being provided with a side outlet, a looped section providing fluid continuity between said frangible section and the side outlet of said cylindrical tube, said looped section being substantially longer than the length of said cylindrical tube, a metal cylinder in said cylindrical tube having a diameter smaller than the inside diameter of said cylindrical tube and contacting the outer wall of said frangible conduit, said side outlet opening in the cylindrical tube being located at a point just downstream from the end of said metal cylinder which is opposite the end which is against the frangible section.

2. An explosion arresting device for arresting a detonation wave travelling through a fluid in a conduit comprising a frangible section included in the conduit, a looped section of tubing connected with the downstream side of the frangible section, a dead end section of tubing in communication with the side of the looped section downstream from the frangible section, said dead end section being substantially shorter in length than the length of said looped section, the dead end of said dead end section being located adjacent said frangible section, whereby a detonation wave travelling counter to the flow of fluid in said conduit and travelling upstream from a point downstream from said looped section will travel back to the junction of the loop and the dead end section, dividing at said junction, and the part of the detonation wave travelling through said dead end section will rupture said frangible section before the part of the detonation wave travelling through said looped section can reach the frangible section.

3. An explosion arresting device for arresting a detonation wave travelling through a fluid in a conduit, said device comprising a frangible conduit section for inclusion in the conduit, a length of tube having a closed end which is in contact with the exterior of said frangible conduit section, the opposite end of said tube being the downstream end, the longitudinal axis of said tube intersecting the longitudinal axis of the frangible section in a direction substantially perpendicular to the longitudinal axis of the frangible section, a side outlet from said tube at some distance from said closed end, a looped section providing fluid continuity between the downstream end of said frangible section and said side outlet, said looped section being substantially longer than the length of said tube, a movable plug in said tube at said dead end for shattering the frangible section when a detonation wave is present in said tube, and means for attaching a length of fluid conduit at the upstream end of said frangible section, means for attaching a second length of fluid conduit at the downstream end of said tube, the second length of fluid conduit having its longitudinal axis substantially collinear with the longitudinal axis of the tube.

4. An explosion arresting device for arresting a detonation wave travelling through fluid in a conduit, said device comprising a frangible conduit section for inclusion in the conduit, a length of tube having an upstream inlet and a downstream outlet which are at a substantial angle to each other, said length of tube having a portion adjacent the exterior of said frangible conduit section with means for transmitting a detonation wave from said tube to the frangible section, a looped section providing fluid continuity between the downstream end of said frangible section and the upstream inlet of said tube, said looped section being substantially longer than the distance between said upstream inlet of the tube and the frangible section, means for attaching a length of ffuid conduit at the upstream end of said frangible section, and means for attaching a second length of fluid conduit at the downstream end of said tube, said second length of fluid conduit having its longitudinal axis substantially collinear with the axis of said length of tube at the downstream end of the latter, and intersecting said frangible section.

5. An explosion arresting device for arresting a detonation wave travelling through fluid in a conduit, said device comprising a frangible conduit section for inclusion in the conduit, a length of tube having an upstream inlet and a downstream outlet which are at a substantial angle to each other, said length of tube having a portion adjacent to the exterior of said frangible conduit section, an annular chamber surrounding said frangible conduit section, said annular chamber opening into said length of tube, a looped section providing fluid continuity between the downstream end of said frangible section and the upstream inlet of said tube, said looped section being substantially longer than the distance between said upstream inlet end of the length of tube and the frangible section, means for attaching a length of fluid conduit at the upstream end of said frangible section, and means for attaching a second length of said fluid conduit at the downstream end of said tube, said second length of fluid conduit having its londitudinal axis substantially collinear with the axis of said length of tube at the downstream end of the latter, and intersecting said frangible section.

6. An explosion arresting device according to claim 5 in which diaphragm means separate said annular chamber surrounding said frangible conduit section from said length of tube, said diaphragm means being located at the junction of said chamber with said tube, and an explosive material having a higher detonation rate than the liquid passing through said conduit enclosed in said annular chamber.

7. An explosion arresting device for arresting a detonation wave travelling through fluid in a conduit, said device comprising a frangible section for inclusion in the conduit, a length of tube having an upstream inlet and a downstream outlet which are at a substantial angle to each other, said length of tube having a portion adjacent the exterior of said frangible conduit section, a second tube having the major portion of its length encircling said frangible section and having its two ends connected to said length of tube, a looped section providing fluid continuity between the downstream end of said frangible section and the upstream inlet of said tube, said looped section being substantially longer than the distance between said upstream inlet of the tube and the frangible section, means for attaching a length of fluid conduit at the upstream end of said frangible section and means for attaching a second length of fluid conduit at the downstream end of said tube, said second length of fluid conduit having its longitudinal axis substantially collinear with the axis of said length of tube at the downstream end of the latter, and intersecting said frangible section.

8. An explosion arresting device according to claim 7 in which the tube having the major portion of its length encircling the frangible section has only one end opening into the length of tube and an explosive material having a rate of detonation higher than the rate of detonation of the fluid flowing through the principal conduit enclosed in said encircling tube.

9. An explosion arresting device for arresting a detonation wave travelling through fluid in a conduit, said device comprising a frangible section for inclusion in the conduit, a length of tube having an upstream inlet and a downstream outlet which are at a substantial angle to each other, said length of tube having a portion adjacent the exterior of said frangible conduit section, a flexible explosive cable said explosive having a detonation rate higher than the detonation rate of the fluid flowing through said conduit encircling said frangible section and having its ends opening into said length of tube, a looped section providing fluid continuity between the downstream end of said frangible section and the upstream inlet of said tube, said looped section being substantially longer than the distance between said upstream inlet of the tube and the frangible section, means for attaching a length of fluid conduit at the upstream end of said frangible section and means for attaching a second length of fluid conduit at the downstream end of said tube, said second length of fluid conduit having its longitudinal axis substantially collinear with the axis of said length of tube at the downstream end of the latter and intersecting said frangible section.

References Cited in the file of this patent

UNITED STATES PATENTS 1,874,019    Mangiameli _____ Aug. 30, 1932